July 25, 1933.  C. A. MATSON  1,919,474
REVERSE BRAKE
Filed April 3, 1929  3 Sheets-Sheet 3
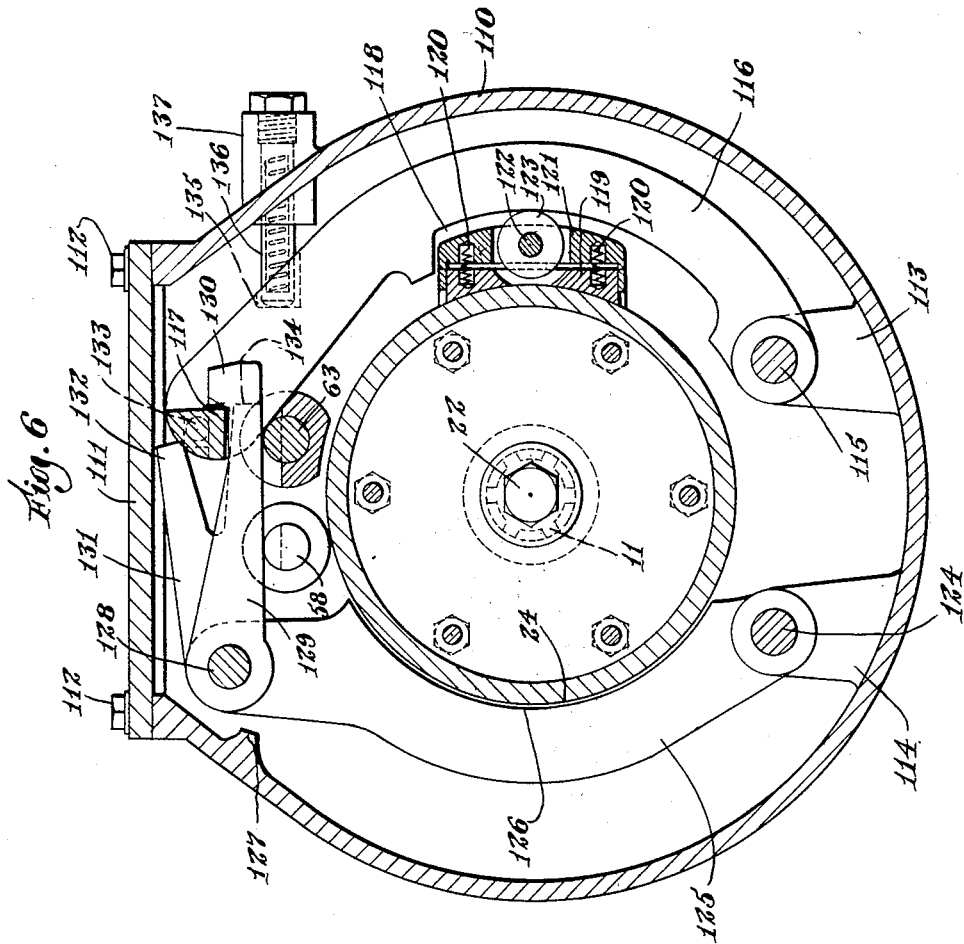
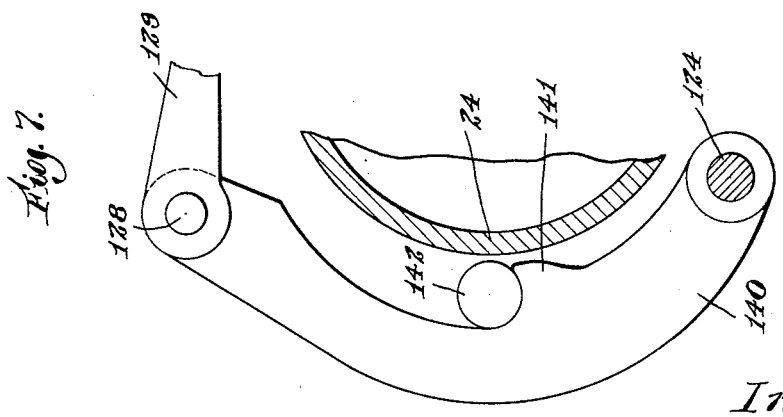
Inventor
Carl A. Matson
by James R. Hodde
Attorney Patented July 25, 1933

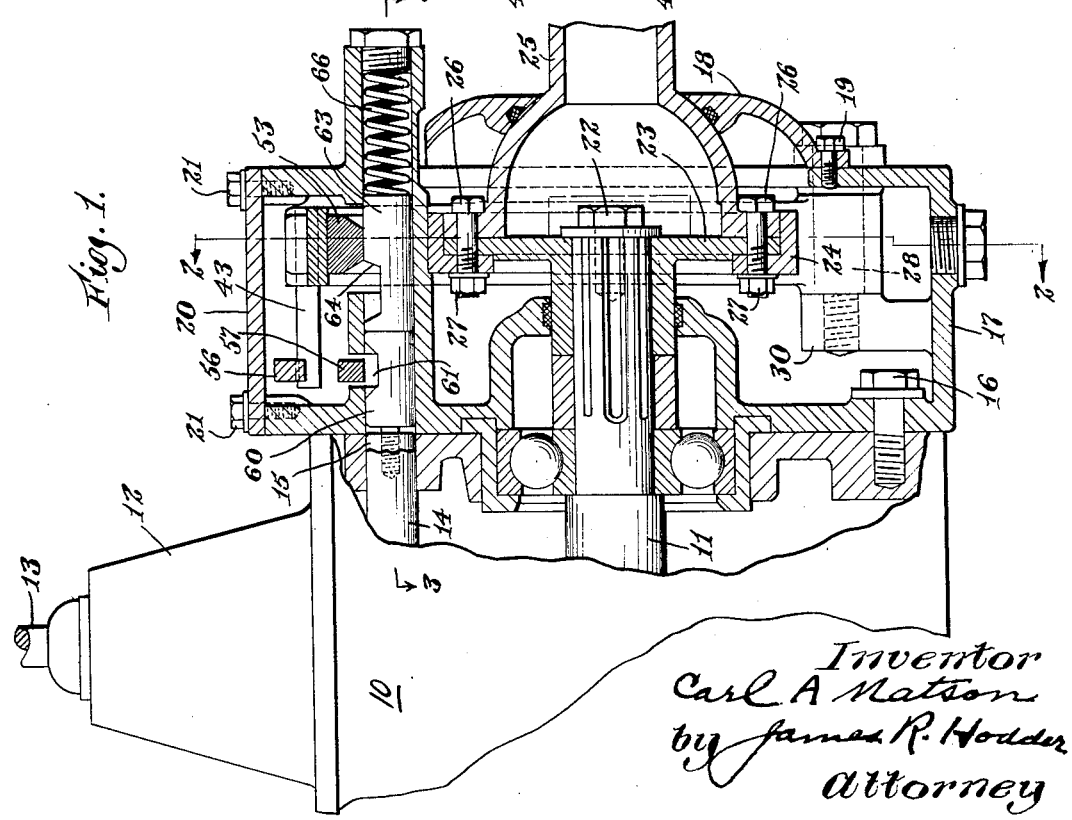

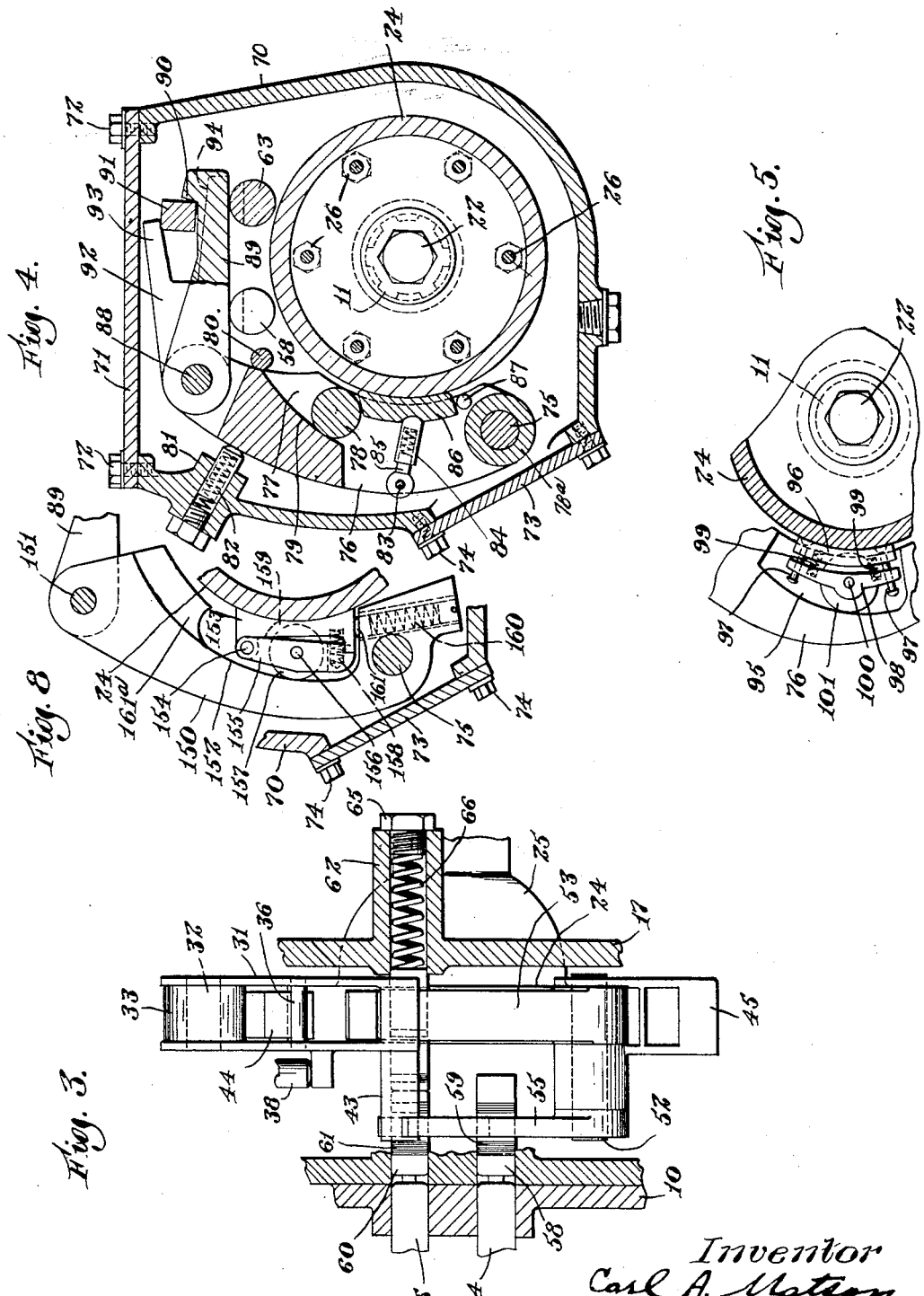

1,919,474

UNITED STATES PATENT OFFICE

CARL A. MATSON, OF LYNNFIELD, MASSACHUSETTS, ASSIGNOR TO THE MATSON COMPANY, OF CONCORD, NEW HAMPSHIRE, A CORPORATION OF NEW HAMPSHIRE

REVERSE BRAKE

Application filed April 3, 1929. Serial No. 352,173.

My present invention relates to a braking mechanism, and more particularly to an improved automatic reverse brake or clutch mechanism for automobiles or other mechanical devices.

In the use of the present day automobile, a dangerous condition frequently arises when it is necessary to stop the vehicle on an incline and where the usual brakes may or may not hold. Regardless of whether such brakes do or do not hold, a serious difficulty arises when it is necessary to start the vehicle in motion after it has been stopped on an incline, and this difficulty becomes all the more serious if the vehicle has been stopped on an incline where there is considerable traffic in close proximity and to the rear. If the driver of the automotive vehicle releases the foot brake to accelerate the engine prior to letting in the clutch, the vehicle will invariably roll back and a possible accident through collision with other cars may occur.

Heretofore the only way in which a car could be started under the conditions outlined above was to set the emergency brake, release the foot brake, accelerate the engine, let in the clutch and gradually and simultaneously let out or release the emergency brake. This operation requires considerable skill and is not always feasible. In my prior applications, Serial Nos. 340,668 and 340,669 filed February 18, 1929, I have described and claimed an improved reverse brake mechanism for automobiles and the like, in which automatic means prevents unauthorized rearward movement of the vehicle and which may be controlled so as to allow rearward movement of the vehicle or forward movement of the vehicle, that is, a device in which the means for preventing rearward movement of the vehicle is placed in such a situation as not to be operative until placed in such condition by the operator. By this device, therefore, I am enabled to throw the reverse brake mechanism out of action so as to permit forward or backward movement at any time of the automotive vehicle, which is extremely desirable, particularly in a garage or other like situation.

My present invention is to be considered an improvement over the devices shown and described in the applications above referred to.

The object of my invention, therefore, is an improved brake or clutch mechanism for automobiles and the like.

In the accompanying drawings illustrating preferred embodiments of my invention, Fig. 1 is a side elevation partly in section of an automobile transmission gearing and showing one form of my invention in section applied thereto;

Fig. 2 is a section on the line 2—2 of Fig. 1;

Fig. 3 is a partial plan view of the mechanisms shown in Figs. 1 and 2, certain portions of the device being omitted for the sake of clearness;

Fig. 4 is a section of a modification taken on a line similar to that on which Fig. 2 was taken in Fig. 1;

Fig. 5 is a partial sectional elevation of a second modification;

Fig. 6 is a sectional end elevation similar to Figs. 2 and 4 and illustrating a still further modification of my invention;

Fig. 7 is a partial sectional elevation showing a modification of the device illustrated in Fig. 6, and Fig. 8 is a partial sectional elevation showing a modified form of the structure illustrated in Fig. 4.

Referring to the drawings, and particularly to Figs. 1, 2, and 3, 10 designates a transmission casing provided with the usual transmission gearing and having rotatably mounted therein and extending through the rear end thereof a transmission shaft 11. Mounted on the top of the transmission casing is a cover 12, in which is pivotally mounted the control lever 13 for operating the slide rods 14 and 15 associated with the change gearing within the casing 10. Attached to the rear of the transmission casing 10 by bolts 16 is a casing 17 open at the rear end and provided with a cover 18 that is secured in position by bolts 19. The casing 17 and cover 18 form an enclosure that is open at the top and such open top is provided with a cover plate 20 secured in position by bolts 21. Secured to the splined end of the transmission shaft 11 by bolt 22 is a flange 23. Fitting on the periphery of the flange 23 is a drum 24, while fitting on the rear face of the flange 23 is a rearwardly extending coupling member 25 constituting a portion of the propeller shaft, which as will be seen in Fig. 1, extends through an opening in the cover 18. Both the drum 24 and coupling member 25 are secured to the flange 23 by a plurality of bolts 26 and nuts 27. The outer peripheral edge of the drum 24 forms a clutching surface for brake members to be hereinafter described.

At the bottom of the casing 17 and on either side of a vertical line passing through the center of the bolt 22, as clearly shown in Fig. 2, are bearing shafts 28 and 29, such shafts passing through the rear face of the casing 17 and threaded into lugs 30 on the interior of the casing 17. Pivotally mounted on the bearing shaft 28 is the lower end of an arcuate member 31, such member extending upwardly and partially surrounding the flange member 23. Intermediate the ends of the member 31 is arranged a laterally extending shaft 32, on which is rotatably mounted a hardened roll 33. Adjacent the roll 33 and below the center of the shaft 32 is a guide pin 34 and a stop pin 35, while adjacent the roll 33 and above such center, on the arcuate member 31 is a stop pin 36. Formed integrally with the arcuate member 31 adjacent the top end thereof is a lug 37 adapted to be engaged by the end of a plunger 38 slidably mounted in a boss 39 formed integrally with the casing 17, such plunger 38 being urged to the left, as viewed in Fig. 2, against the lug 37 by a coiled spring 40 within the plunger 38 and in the boss 39. A screw plug 41 closes the outer end of the perforation in the boss 39 and against which one end of the coiled spring 40 engages. Formed at the top of the arcuate member 31 and laterally extending outwardly from one face thereof is a latch member 42 for a purpose to be hereinafter described. Also adjacent the top end of the arcuate member 31 and extending laterally outward from the opposite face of the arcuate member is a pin 43 for a purpose to be hereinafter described. The peripheral face of the drum 24, the roll 33, the stop pins 35 and 36 and the guide pin 34 define a chamber in which is loosely mounted a wedge 44, one face of such wedge engaging with the drum 24, while the other face is adapted to be engaged by the roll 33.

Pivotally mounted on the shaft 29 is the lower end of an arcuate member 45 which is generally the shape of the arcuate member 31 but which differs therefrom in certain details of construction to be hereinafter described. The upper end of the arcuate member 45 engages with a boss 46 formed integrally with and on the inner surface of the casing 17 to prevent counter-clockwise rotation of the arcuate member 45 on the shaft 29. Formed integrally with the arcuate member 45 and on one face thereof is a boss 47, the inner face of which forms a cam surface adapted to be engaged by a locking roll 48. Secured to the face of the arcuate member 45 by pins 49 is a stop plate 50 against which the locking roll 48 may abut in one of its positions. Secured to the arcuate member 45 adjacent its top end is a shaft 51, on which is mounted a stop roller 52a against which the locking roll 48 is adapted to engage in another of its positions. Secured to the top end of the arcuate member 45 is a shaft 52, on one end of which is rotatably mounted a lever 53, the outer end of which is provided with a latch portion 54 adapted to engage with the latch portion 42 on the arcuate member 31, and when such locking members are in engagement with each other, the arcuate members 31 and 45 occupy the position shown in Fig. 2. On the other end of the shaft 52 is rotatably mounted a forked member 55, one tine 56 of which is adapted to engage with the top laterally extending pin 43 on the arcuate member 31 and the other tine, 57, of which is adapted to engage with extensions of the gear shifting rods 14 and 15 in a manner to be hereinafter described.

Secured to the gear shift rod 14 is an extension 58 provided on its upper surface with a wedge cam 59. This extension 58 is only shown in Fig. 3, having been omitted from the showing of Fig. 1 for the sake of clearness. Secured to the rear end of the gear shift rod 15 is an extension 60, similar in all respects to the extension 59, being provided also with the wedge shaped cam 61. The casing 17 is provided on its rear face and in alinement with the gear shift rod 15 with a boss 62 drilled to receive as a sliding fit a cam member 63, which cam member is provided with a wedge cam 64, similar to the wedge-shaped cams 59 and 61 in the gear shift rod extensions 58 and 60. The open end of the boss 62 is closed by a screw plug 65 and between the inner end of such plug 65 and the rear end of the member 63 is a coiled spring 66, this spring 66 constantly urging the member 63 to the left, as viewed in Figs. 1 and 3, so as to keep the same always in engagement with the rear end of the extension 60 unless otherwise prevented in a manner to be hereinafter described.

Assuming the device to have been constructed and arranged as above described, with the parts in the position shown in Fig. 2, and with the transmission shaft 11 rotating in a counter-clockwise direction in order to cause forward movement of the vehicle to which the device is assumed to be attached, and that it is desired to prevent clockwise movement of such transmission shaft 11, if the device is brought to rest by throwing out the usual clutch mechanism (not shown) and operating the lever 13 to move the transmission gearing (not shown) into neutral, the vehicle will start to move backward if the car has been stopped on an incline. Attempted rotary movement of the transmission shaft 11 will, therefore, take place in a clockwise direction, as viewed in Fig. 2, and immediately upon such rotary movement taking place, the wedge 44 will be crowded downwardly between the peripheral face of the drum 24 and the roll 33. The wedge 44 is tapered and in its downward movement is guided by the guide pin 34 and under ordinary conditions will be stopped before reaching the stop pin 35. The wedging action exerted between the drum 24 and the roll 33 will be sufficient to stop rotative movement of the transmission shaft 11 in a clockwise direction and, therefore, such rotary movement will be positively prevented. The operator of the vehicle to which the device is attached will, therefore, in starting the vehicle, simply operate the lever 13 to move the gear shift rods 14 and 15 into their proper position to attain the first, second and finally the third speeds forward of the device, and in this motion of the gear shift rod 15, the spring 66 will insure that the member 63 is always in engagement with the extension 60.

If it is desired to allow a rearward movement of the vehicle to which the device is assumed to be attached or to permit rotary movement of the transmission shaft 11 in a clockwise direction, as viewed in Fig. 2, the operator will move the lever 13 so as to move the transmission gear shift rod 15 rearwardly, as viewed in Figs. 1 and 3, thereby moving the extension 60 on such rod and also the member 63 rearwardly against the tension of the spring 66, bringing in this manner the wedge cam surface 64 into alinement with the lever 53. The lever 53 will rotate upon its shaft 52 and will drop into the wedge cam 64 a sufficient distance to drop the latch portion 54 out of engagement with the latch 42 on the arcuate member 31. The transmission shaft 11 is now free to rotate in a clockwise direction, as during this movement, the cam 44 will be moved downwardly as above described, but in the present instance forces the roll 33 outwardly and rotates the arcuate member 31 about its shaft 28, the latch member 42 riding over the latch member 54 on the lever 53. When the upper end of the arcuate member 31 has moved a sufficient distance to the right, as viewed in Fig. 2, the tine 56 of the fork 55 will drop downwardly and remain in alinement with the laterally extending rod 43, such downward movement of the tine 56 being limited by the tine 57 engaging with the bottom of the wedge cam 61 in the member 60. The arcuate member 31 having imparted thereto a rotating movement in a clockwise direction on the shaft 28, the pocket for the wedge 44, defined by the drum 24, roll 33, pins 34 and 35, will be so enlarged that there will be no wedging action taking place between the roll 33 and the drum 24 and, therefore, the wedge 44 will continue downwardly until engaged by the pin 35, when it will be brought to rest. Should the roll 48 be engaged by the drum 24, it will be moved upwardly by engagement of such drum 24 and the cam surface on the boss 47, this, however, merely tending to rotate the arcuate member 45 in a counter clockwise direction until brought to rest upon engagement with the boss 46 on the inner face of the casing 17. The locking roll 48 will, in the meantime, have been brought into engagement with the roll 52a on the shaft 51 and will rotate idly during the rotation of the transmission shaft 11 in a clockwise direction. The reverse brake mechanism having been put out of action is held out of action by the lever 53, which is prevented from rising out of the cam 64 by the engagement of the top of the locking member 54 with the locking member 42. At this time the fork 55 is in its uppermost position, as shown in Figs. 1 and 2, even though the laterally extending rod 43 has been moved to the right, as shown in Fig. 2, and there is ample space for the tine 56 of the fork 55 to fall into position in the line of movement of such rod 43. Such movement, however, is prevented because of the fact that the tine 57 of the fork 55 is resting on the cylindrical face of the member 60 and out of possible engagement with the cam slot 61 therein. When, however, the lever 13 is operated to move the transmission gearing (not shown) in the casing 10, into neutral position, the cam slot 61 in the member 60 is brought into alinement with the tine 57 of the fork 55, as shown in Fig. 1 and, therefore, the fork 55 will rotate on the shaft 52 and will bring the tine 56 into the path of movement of the laterally extending rod 43. During this movement of the member 60 from reverse to neutral position, the locking members 54 and 42 are not brought into engagement with each other because of the fact that the locking member 42 is riding on top of the member 54 and when the tine 56 has dropped into the line of movement of the laterally extending rod 43, the arcuate member 31 cannot rotate a sufficient distance in a counter clockwise direction to allow the locking members 42 and 54 to be brought into engagement with each other. Therefore, when the transmission gearing is in neutral, after having been brought into neutral from the reverse position, the reverse brake mechanism is still locked out of action and, therefore, it will be possible to rotate the transmission shaft 11 either clockwise or counter clockwise at will and without interference with such rotation by the reverse brake mechanism. The reverse brake mechanism will remain out of operative condition as long as the transmission gearing is in neutral position but when the transmission gearing is moved into any of its forward speeds, the cam 59 on the member 58 or the cam 61 on the member 60 will engage with the tine 57 and will rotate the fork 55 in a counter clockwise direction, as viewed in Fig. 2, lifting the tine 56 upwardly out of the path of movement of the laterally extending pin 43, whereupon the spring pressed plunger 38 will tend to rotate the arcuate member 31 in a counter clockwise direction. This will cause a frictional engagement of the wedge 44 with the roll 33 and periphery of the drum 24, whereupon counter-clockwise rotation of the drum 24 will move the wedge 44 upwardly between the drum 24 and roll 33 until said wedge engages the stop pin 36. Meanwhile the spring pressed plunger 38 has been bearing against the lug 37, forcing the lever 31 to the left, Fig. 2, until it has been moved a sufficient distance so as to bring the locking member 42 thereon into position to be brought into locking engagement with the locking member 54 on the lever 53. Immediately the upper end of the arcuate member 31 has rotated a sufficient distance for the locking member 42 to ride off the top of the locking member 54, the spring pressed member 63 will, through the cam 64 thereof bearing against the cam shaped portion of the lever 53, rotate the free end of the lever 53 upwardly so as to bring the locking member 54 thereon into locking engagement with the member 42, as viewed in Fig. 2.

Referring now to Fig. 4, there is shown a modification of the device above described and in this instance an enclosing casing 70 for the reverse brake mechanism is provided, this casing having a cover 71 at its top secured to the casing by bolts 72 and an inspection plate 73 at one side thereof secured to the casing 70 by bolts 74. In the casing 70 is mounted at one side of and below the transmission shaft 11 a shaft 75 on which is rotatably mounted an arcuate member 76. This arcuate member 76 is cut away, as indicated at 77, to form a runway for a locking roller 78, a boss 78a having its face 79 forming, with the outer face of the drum 24, a wedge-shaped or tapered chamber for the locking roll 78. Rotative movement of the arcuate member 76 in a clockwise direction is prevented by a rod 80 secured to the casing 70 and rotative movement of such arcuate member in a counter clockwise direction is limited by a boss 81 formed integral with the casing 70. In the boss 81 is slidably mounted a spring pressed plunger 82, such plunger engaging with the arcuate member 76 and tending to force the same to rotate in a clockwise direction, as viewed in Fig. 4. Mounted on the arcuate member 76 is a shaft 83, on which is pivotally mounted a stem 84 that has mounted thereon a spring pressed plunger 85. This spring pressed plunger engages with a groove in the outer face of the brake shoe 86 that engages with the face of the brake drum 24. The stem 84 and spring pressed plunger 85 constantly hold the brake shoe 86 in engagement with the brake drum 24. A pin 87 on the arcuate member 76 limits the downward movement of the brake shoe 86 and the upward movement thereof is limited by the locking roll 78. The normal rotation of the transmission shaft 11 is in a counter clockwise direction, as viewed in Fig. 4 and in this position the brake shoe 86 is in engagement with the stop pin 87 and the upper end of the brake shoe 86, together with the lower end of the cam face 79, form a pocket in which the locking roll 78 is located, the locking roll 78, therefore, remaining out of engagement with the brake drum 24 in the normal rotation of the transmission shaft 11. At the upper end of the arcuate member 76 is arranged a shaft 88, on one end of which is rotatably mounted a lever 89 provided at its free end with a locking latch 90 adapted to engage with a locking bar 91 formed integral with or fixed to the casing 70. On the other end of the shaft 88 is rotatably mounted a fork 92, one tine 93 of which is adapted to engage with the bar 91 and the other tine 94 of which is adapted to engage with or be engaged by the cams 59 and 61 of the members 58 and 60 respectively.

If the parts have been constructed and arranged as above described and if, under these circumstances, it is attempted to rotate the transmission shaft 11 in a clockwise direction as viewed in Fig. 4, the brake shoe 86 will be moved upwardly by the brake drum 24, forcing the locking roll 78 into the wedge shaped passage defined by the cam surface 79 and the face of the brake drum 24, thus firmly locking the transmission shaft 11 against rotation. During the locking action the arcuate member 76 is prevented from rotating in a counter clockwise direction by the engagement of the locking latch 90 of the lever 89 with the fixed bar 91. In order to throw the reverse brake mechanism shown in Fig. 4 out of operative position, the operator will move the control lever 13 so as to move the change gear rod 15 rearwardly, or to the right, as viewed in Fig. 1, thus moving the cam slots 64 in the member 63 into vertical alinement with the lever 89, and such lever 89 will drop into the cam slot 64 and bring the locking latch thereon out of engagement with the fixed bar 91. Under these circumstances rotative movement of the transmission shaft 11 in a clockwise direction, as viewed in Fig. 4, will cause the locking roll 78 to engage with the cam 79 and rotate the arcuate member 76 in a counter clockwise direction against the tension of the spring pressed plunger 82, and in this movement bringing the upper end of the locking latch 90 below the fixed bar 91. In this reverse position of the transmission gearing the fork 92 cannot rotate because of the fact that the tine 94 thereof is engaging with the cylindrical face of the member 60. The fork 92, therefore, remains in the position shown in Fig. 4. The parts of the device being now in reverse position, the operator may wish to move the vehicle to which the device is presumably attached forwardly without having any gear in mesh, that is the transmission gearing is to be in neutral position and it is desired to still keep the reverse brake mechanism out of operative position. To do this the operator merely operates the control lever 13 to move the change gear rods 14 and 15 into position to move the transmission gearing into neutral and when this movement takes place, the cam slots 59 and 61 are brought into alinement with the tine 94 of the fork 92. During this movement also it will be understood that the member 63 is locked in its rearmost position because of the fact that the free end of the lever 89 cannot ride out of the cam slot 64 in the member 63. When the transmission gearing reaches neutral position, the fork 92 rotates in a clockwise direction on the shaft 88, bringing the tine 93 thereof into position to engage with the side face of the bar 91, thus preventing rotative movement of the arcuate member 76 in a clockwise direction and permitting, however, the transmission shaft 11 to be rotated either right or left-handed at will and this condition will exist until such time as the operator moves the transmission gearing into one or the other of its forward speeds. When this operation takes place, the tine 94 is engaged by one or both of the cam slots 59 and 61 and, therefore, is rotated upwardly in a clockwise direction about its shaft 88, whereupon the spring pressed plunger 82 will rotate the arcuate member 76 in a clockwise direction, thus moving the locking latch 90 out from under the fixed bar 91 and allowing the cam slots 64 to force the free end of the lever 89 upwardly into the position shown in Fig. 4.

Referring now to Fig. 5 there is shown a modification of the device shown in Fig. 4 and I have in this modification combined the brake shoe 86 and the locking roll 78 of Fig. 4 into a unitary structure. In this case also I have formed in the arcuate member 76 a wedge-shaped chamber 95 and place therein a brake shoe 96 adapted to engage with the peripheral face of the brake drum 24. On either end of the brake shoe 96 are radially extending rods or shafts 97 and on these rods or shafts is slidably mounted a carrier 98. Coiled springs 99 are interposed between the carrier 98 and the brake shoe 96, thus tending to always force the carrier 98 outwardly on the shafts 97 and away from the brake shoe 96. Rotatably mounted on the shaft 100, carried by the carrier 98, is a locking roll 101, similar to the locking roll 78 in Fig. 4. The brake shoe 98 is slotted to allow the locking roll 101 to extend therethrough into engagement with the brake drum 24. Assuming the transmission shaft 11 to try to rotate in a clockwise direction, as viewed in Fig. 5, then the brake shoe 96 will be moved upwardly in the wedge shaped chamber 95 and the locking roll 101 engaging with the face of the wedge shaped chamber 95 will compress the springs 99 and will move gradually toward the brake drum 24 and when in position to engage the side of the wedge-shaped chamber 95 and the brake drum 24 simultaneously, a locking action takes place similar to the locking action with respect to the construction shown in Fig. 4.

Referring now to Fig. 6, wherein is shown a still further modification of my invention, the casing 110 is secured to the transmission casing 10 in the usual manner and such casing is provided with a cover 111 secured by bolts 112. On the interior of the casing 110 and on either side of the vertical line passing through the center of the transmission shaft 11, are bosses 113 and 114 respectively. In the boss 113 is placed a shaft 115 on which is rotatably mounted an arcuate member 116, such arcuate member partially surrounding the brake drum 24 and provided at its upper end with a locking member 117. Intermediate the ends of the arcuate member 116 is provided a cut-out portion 118, in which is located a brake shoe and locker roll assembly composed of a brake shoe 119, having yieldingly mounted thereon, by springs 120, a carrier 121. In the carrier 121 is a shaft 122 on which is rotatably mounted a locking roll 123 and which roll is adapted to engage with the wall of the cut-out portion 118 and with the peripheral face of the brake drum 24 simultaneously.

In the boss 114 is arranged a shaft 124 on which is rotatably mounted a brake lever 125, this brake lever having formed on its inner face a braking surface 126 which is adapted to engage with the peripheral face of the drum 24. The member 125 extends upwardly, as viewed in Fig. 6, and rotative movement of such member on the shaft 124 in a counter clockwise direction is limited by a stop 127 formed integral with the casing 110 and on the inner face thereof. At the upper end of the member 125 is arranged a shaft 128, on one end of which is rotatably mounted a lever 129 provided at its free end with a locking member 130 which co-operates with the locking member 117 on the arcuate member 116. Rotatably mounted on the other end of the shaft 128 is a fork 131, one tine 132 of which is adapted to co-operate with a laterally extending rod 133 that is attached to the upper end of the arcuate member 116 and with a tine 134 that is adapted to engage with one or the other of the cam slots 59 and 61 in the members 58 and 60 respectively, attention in this regard being called to Figs. 1 and 3. A recess 135 is formed on the arcuate member 116 and in such recess is adapted to be seated a spring pressed plunger 136 slidably mounted in a boss 137 formed integral with the casing 110.

The operation of this modification is substantially similar to the other modifications above described in detail but has the advantage over the modification described with respect to either Figs. 4 or 5 in that by having braking members arranged on diametrically opposite sides of the brake drum 24, a more evenly balanced braking pressure is exerted on the transmission shaft 11. The locking members 117 and 130 operate when the device is in the position shown in Fig. 6 to hold the locking roll 123 in position to have both the locking roll 123 and the braking surface 126 operate simultaneously and when the transmission gearing is placed in reverse position, the lever 129 co-operates with the cam slot 64 in the member 63 to permit outward movement of the upper ends of the arcuate members 116 and 125 with respect to each other in order to so enlarge the cut-away portion 118 in the arcuate member 116 as to permit rotary movement of the transmission shaft 11 in a clockwise direction without danger of a braking action being had thereon.

It will be noted with respect to the locking roll shown in Figs. 2 and 4, that the locking rolls 48 and 78 respectively are maintained out of actual physical contact with the braking drum 24 except when it is desired to have the same in locking relation therewith and, therefore, I have devised the modification shown in Fig. 7, which modification may be substituted for the braking member 125 shown as pivotally mounted on the shaft 124 in Fig. 6. This modification shown in Fig. 7 consists of an arcuate member 140, having at its upper end the shaft 128 similar to that shown in Fig. 6 and on which shaft the lever 129 is pivotally mounted. Intermediate the ends of the member 140 and on the inner face thereof is formed, by a projection 141, a pocket or seat in which fits a locking roll 142 and which locking roll is maintained out of physical engagement with the braking drum 24. Assuming, however, that the structure shown in Fig. 7 to have been substituted in Fig. 6 for the lever 125, then it will be obvious that after such substitution, the locking roll 142 will be maintained out of engagement with the braking drum 24 until such time as it is attempted to rotate the transmission shaft 11 in a clockwise direction, such attempt resulting in a movement of the brake shoe 119 downwardly, as viewed in Fig. 6, bringing the locking roll 123 into simultaneous engagement with the wall of the cut-out portion 118 and the peripheral face of the brake drum 24, thus causing a rotation of the arcuate member 116 about its shaft 115 in a clockwise direction and a simultaneous rotation of the lever 140 in a clockwise direction, thus bringing the locking roll 140 into engagement with the peripheral face of the brake drum 24. This locking roll 142 being at this time in engagement with the inner face of the lever 140 and such inner face being curved so as to provide, with the peripheral face of the brake drum 24, a wedge-shaped chamber, it is obvious that the locking roll 142 will exert a braking force on the brake drum 24 and, therefore, on the transmission shaft 11.

Referring now to Fig. 8, wherein is shown a modification of the type of device illustrated in Figs. 4 and 5, the arcuate member 76 that is rotatably mounted on the shaft 75 in the casing 70 may be replaced by an arcuate member 150 provided at its top end with a shaft 151 similar to the shaft 88 and on which is mounted the lever 89 to co-operate with the fixed bar 91 on the casing 70. The arcuate member 150 has formed therein a cut-away portion 152 in which is arranged a brake shoe 153 adapted to engage with the peripheral face of the brake drum 24. Hingedly attached to the brake shoe 153 at the point 154 is a carrier 155, this carrier 155 being provided with a shaft 156 on which is rotatably mounted the locking roll 157. This locking roll is adapted to engage with the wall of the opening 152 and with the peripheral face of the brake drum 24 simultaneously so as to lock the transmission shaft 11 from rotative movement in a clockwise direction, as viewed in Fig. 4. The free end of the carrier 155 is yieldingly associated with one end of the brake shoe 153 by means of a coiled spring 158, such coiled spring tending to rotate the carrier 155 about the shaft 154 in a clockwise direction and, therefore, tending to keep the locking roll 157 in engagement with the wall of the cut-away portion 152 and out of engagement with the peripheral face of the brake drum 24. The brake shoe is cut away as indicated at 159 to provide for the extending of the locking roll 157 therethrough and into engagement with the peripheral face of the brake drum 24. The lower end of the arcuate member 150 is drilled in a direction substantially tangential to the brake drum 24, and in such drilled portion is yieldingly mounted, by spring 160, a plunger 161 which bears against the lower face of the brake shoe 153 and tends always to force such brake shoe and attached carrier and locking roll upwardly, as viewed in Fig. 8. As the transmission shaft 11 rotates in a counter clockwise direction, which is the usual direction of rotation under normal operation of the device, the friction between the brake shoe 153 and the brake drum 24 is sufficient to allow the plunger 161 to be depressed so as to bring the brake shoe 153 and attached parts into approximately the position shown in Fig. 8 and, therefore, the locking roll 157 being out of engagement with the brake drum 24, no locking action is effected on the transmission shaft 11. If, however, it is attempted to rotate the transmission shaft 11 in a clockwise direction, as viewed in Fig. 8, there will be a certain amount of friction existing between the brake shoe 153 and the brake drum 24 so as to move the brake shoe 153 and attached parts upwardly, as viewed in such Fig. 8, and this upward movement is materially assisted by the spring pressed plunger 161. The locking roll 157 is, therefore, moved into locking position practically instantaneously and there can be very little rotative movement of the transmission shaft 11 in a clockwise direction before the same is rigidly locked against further movement.

It will be noted that the construction of the locking devices in Figs. 2, 4, and 6 is such as to afford a positive locking and an extremely easy release when the holding means is operated, and that but very little strain is placed on the holding means. Considering the construction illustrated in Fig. 2 for example, it will be noted that the angle the holding notch at 54 makes with a line drawn from the bottom of the notch through the centre of the shaft 52 is greater than a right angle, and also that the included angle of the part 42 is less than a right angle. It will be obvious therefore, that when the member 63 is in the position shown in Fig. 2, that the parts 42 and 54 are securely held or locked together, and that when the holding means 63 is moved to releasing position, the member 42 rides up on the inclined face of the notch 54 and out of engagement therewith.

The upper end of the cut-away portion 152, or that end adjacent to the shaft 151 on which is mounted the lever 89, has formed therein a stop member 161a, this portion being adapted to enter the sides of the shoe 153 and engage with the locking roll 157. By this construction I avoid the chance of breaking the shaft 156 of the roller 157.

While I have necessarily shown and described the preferred embodiments of my invention somewhat in detail, it is to be understood that I may vary the size, shape, and arangement of parts comprising the structure within wide limits without departing from the spirit of the invention.

Having thus described my invention, what I claim as new is:

1. In a device of the kind described, the combination with a transmission gearing, including a transmission shaft and a propeller shaft, of a reverse brake mechanism, including an annular flange, and means for connecting the annular flange directly to the transmission and propeller shaft.

2. In a device of the kind described, the combination with a transmission gearing, including a transmission shaft and a propeller shaft, a connecting flange interposed between the two said shafts, of a reverse brake mechanism, including an annular flange, and means for connecting the annular flange to the connecting flange.

3. In a device of the kind described, the combination of a shaft mounted for rotation in either direction, means including a rolling locking element to engage the shaft for preventing rotary movement of the shaft in a reverse direction, and resilient means for maintaining the locking element out of engagement with the shaft during the rotary movement of the shaft in a forward direction.

4. In a device of the kind described, the combination of a shaft mounted for rotation in either direction, means, including a brake shoe and a rolling locking element carried thereby for preventing rotary movement of the shaft in a reverse direction, and resilient means for maintaining the locking element out of engagement with the shaft during the rotary movement of the shaft in a forward direction.

5. In a device of the kind described, the combination of a casing, a shaft mounted for rotation in either direction, means, including a brake shoe and a locking roll for preventing rotary movement of the shaft in a reverse direction, means for maintaining the locking roll out of engagement with the shaft during the rotary movement of the shaft in a forward direction, and means for positively moving said roll into locking position.

6. In a device of the kind described, the combination of a shaft mounted for rotation in either direction, a plurality of members associated therewith, means for interlocking said plurality of members together, and means associated with said plurality of members and with said shaft and including a rolling locking element for normally preventing rotative movement of said shaft in one direction.

7. In a device of the kind described, the combination of a shaft, a rolling locking member associated therewith, means for maintaining said member fixed with relation to the shaft and resilient means for holding said rolling locking member out of engagement with said shaft during rotary movement of said shaft in one direction.

8. In a device of the kind described, the combination of a shaft, a plurality of pivoted members partially surrounding said shaft, a locking abutment, movable locking means cooperating therewith, a locking notch formed at one end of the movable locking means, the angle of the locking notch being greater than 90 degrees.

9. In a device of the kind described, the combination of a shaft mounted for rotation in either direction, a pair of pivotally mounted arcuate levers partially surrounding said shaft, a brake shoe associated with one of said levers, a locking roll associated with the other lever, said brake shoe and said locking roll being adapted to prevent rotary movement of the shaft in one direction, and means for maintaining the locking roll out of engagement with the shaft during rotary movement of the shaft in the other direction.

10. In a device of the kind described, the combination of a shaft mounted for rotation in either direction, a pair of pivotally mounted arcuate levers partially surrounding said shaft, a brake shoe associated with one of said levers, a locking roll associated with the other lever, said brake shoe and said locking roll being adapted to prevent rotary movement of the shaft in one direction, means for maintaining the locking roll out of engagement with the shaft during rotary movement of the shaft in the other direction, and means for positively moving said roll into locking position.

11. In a device of the kind described, the combination of a shaft mounted for rotation in either direction, a pair of pivotally mounted arcuate levers partially surrounding said shaft, a brake shoe associated with one of said levers, a locking roll associated with the other lever, said brake shoe and said locking roll being adapted to prevent rotary movement of the shaft in one direction, and interengaging means carried by said levers to maintain said levers fixed with relation to said shaft.

12. In a device of the kind described, the combination of a shaft mounted for rotation in either direction, a pair of pivotally mounted arcuate levers partially surrounding said shaft, a brake shoe associated with one of said levers, a locking roll associated with the other lever, said brake shoe and said locking roll being adapted to prevent rotary movement of the shaft in one direction, interengaging means carried by said levers to maintain said levers fixed with relation to said shaft, and automatically actuated means for breaking the connection between the interengaging means on said levers to permit rotation of the shaft in either direction.

13. In a device of the kind described, the combination of a shaft mounted for rotation in either direction, a pair of pivotally mounted arcuate levers partially surrounding said shaft, a brake shoe associated with one of said levers, a locking roll associated with the other lever, said brake shoe and said locking roll being adapted to prevent rotary movement of the shaft in one direction, interengaging means carried by said levers to maintain said levers fixed with relation to said shaft, and means to maintain said interengaging means in engaged position.

14. In a device of the kind described, the combination of a shaft mounted for rotation in either direction, a pair of pivotally mounted arcuate levers partially surrounding said shaft, a brake shoe associated with one of said levers, a locking roll associated with the other lever, said brake shoe and said locking roll being adapted to prevent rotary movement of the shaft in one direction, interengaging means carried by said levers to maintain said levers fixed with relation to said shaft, means to maintain said interengaging means in engaged position, and means for breaking the connection between the interengaging means to permit rotation of the shaft in either direction.

15. In a device of the kind described, the combination of a shaft mounted for rotation in either direction, a pair of pivotally mounted arcuate levers partially surrounding said shaft, a brake shoe associated with one of said levers, a locking roll associated with the other lever, said brake shoe and said locking roll being adapted to prevent rotary movement of the shaft in one direction, interengaging means carried by said levers to maintain said levers fixed with relation to said shaft, means to maintain said interengaging means in engaged position, and automatically actuated means for breaking the connection between the interengaging means to permit rotation of the shaft in either direction.

16. In a device of the kind described, the combination of a shaft mounted for rotation in either direction, a rotating member of a roll clutch constantly operatively connected to said shaft, another part of the roll clutch secured to a fixed part of the device, a locking roll interposed between the members of said roll clutch, and means for moving said locking roll out of contact with the rotating member during movement of said member in a forward direction.

17. In a device of the kind described, the combination of a shaft mounted for rotation in either direction, a rotating member of a roll clutch operatively connected to said shaft, another part of the roll clutch secured to a fixed part of the device, a locking roll interposed between the members of said roll clutch, and a friction member engaging the locking roll and the rotating member and acting to move the locking roll out of contact with the rotating member during movement of the rotating member in one direction.

18. In a reverse brake mechanism for automobiles, the combination of a shaft mounted for rotation in either direction, said shaft being connected to the wheels of an automobile, an over-running roll clutch to lock the shaft against rotation in a reverse direction, said clutch including a rotatable member, means operated by the gear shift lever of the automobile when moved toward reverse position to render said clutch inoperative, and automatic means for maintaining the rotatable locking member out of engagement with the shaft during rotation of the shaft in a forward direction.

19. In a reverse brake mechanism for automobiles, the combination of a shaft mounted for rotation in either direction, said shaft being connected to the wheels of said automobile, an over-running roll clutch to lock the shaft against rotation in a reverse direction, said clutch including a rotatable member, means operated by the gear shift lever of the automobile when moved toward reverse position to render said clutch inoperative, means to maintain said clutch inoperative when the gear shift lever is moved to neutral position, and automatic means for maintaining the rotatable member out of engagement with the shaft during rotation of the shaft in a forward direction.

20. In a reverse brake mechanism for automobiles, the combination of a shaft mounted for rotation in either direction, said shaft being connected to the wheels of said automobile, an over-running roll clutch to lock the shaft against rotation in a reverse direction, said clutch including a rotatable member, and means for maintaining the rotatable member out of engagement with the shaft during rotation of the shaft in a forward direction.

21. In a device of the kind described, a shaft mounted for rotation in either direction, means, including a brake shoe and a locking roll for preventing rotary movement of the shaft in a reverse direction, and means for maintaining the locking roll out of engagement with the shaft during the rotary movement of the shaft in a forward direction.

CARL A. MATSON.